May 13, 1969

D. S. REYNOLDS ET AL 3,443,508

AUTOMATIC BEVERAGE BREWER

Filed Feb. 26, 1968

INVENTORS
DONALD S. REYNOLDS, HARVEY R. KRUEGER
& ARTHUR A. MORGAN

BY

*Prangly, Baird, Clayton, Miller & Vogel*

ATTYS.

INVENTORS
DONALD S. REYNOLDS, HARVEY R. KRUEGER,
& ARTHUR A. MORGAN
BY
Prangley, Baird, Clayton, Miller & Vogel
ATTYS.

INVENTORS
DONALD S. REYNOLDS, HARVEY R. KRUEGER
BY  & ARTHUR A. MORGAN

Prangley, Baird, Clayton, Miller & Vogel
ATTYS.

United States Patent Office 3,443,508
Patented May 13, 1969

3,443,508
AUTOMATIC BEVERAGE BREWER
Donald S. Reynolds, Chicago, Harvey R. Krueger, Carpentersville, and Arthur A. Morgan, Palatine, Ill., assignors to Reynolds Products, Inc., Rolling Meadows, Ill., a corporation of Illinois
Filed Feb. 26, 1968, Ser. No. 708,121
Int. Cl. A47f 31/24, 31/36, 47/00
U.S. Cl. 99—282               23 Claims

ABSTRACT OF THE DISCLOSURE

There is disclosed an automatic beverage brewing machine for brewing coffee or the like, comprising a water tank having a side wall and a bottom wall and a top wall, thermostatically controlled heating means disposed within the water tank for heating and maintaining water therein at a beverage brewing temperature, discharge means associated with the water tank for discharging hot water therefrom, means for receiving a beverage producing material to be covered by hot water from the discharge means, water inlet means for introducing cold water into the tank to cause hot water in the tank to be discharged therefrom in an amount corresponding to the amount of cold water introduced thereto, and valve means associated with the discharge means for preventing discharge of hot water from the water tank until the water therein reaches a predetermined level, the valve means being controlled by the water inlet means so that so long as cold water is being introduced into the tank the valve means prevents the discharge of hot water from the tank.

This invention relates generally to beverage brewing apparatus and more particularly to an improved type of automatic coffee brewer capable of automatically brewing predetermined amounts of coffee.

As is well known, most automatic coffee makers operate on either a timed cycle arrangement wherein a timer controls the water input to the machine, or a pressure or weight type arrangement wherein a scale is operative to shut off flow of incoming water to the machine when a predetermined weight of brewed coffee fills a beaker disposed on the scale. Each of these arrangements has certain disadvantages. In the timed cycle system, the water input to the machine is not always constant but may vary as the pressure of the inlet source of water to the machine varies, while the weight type system requires expensive and complicated controls to insure proper operation of the machine.

It is, therefore, a primary object of the invention to provide an automatic beverage brewer which will automatically brew a predetermined amount of liquid beverage, the structure being provided in a highly simplified unit which effectively performs all of the necessary functions for the automatic brewing of a beverage and wherein the beverage brewer may be utilized as a constant source of brewed beverage with a minimum of attended servicing.

It is a further object of the invention to provide an automatic beverage brewing machine having a positive displacement type water system, the machine employing a unique control arrangement which eliminates the need for a timer or scale to control the input quantity of water to the machine.

Still another object of the invention is to provide a unique control system and water inlet system for an automatic beverage brewer wherein the input quantity of cold water to the system will be substantially constant for each cycle of operation regardless of variations in inlet water pressure which may occur in various locations in the country or at the same location during different periods of the day.

It is a further object of the invention to provide an automatic beverage brewer of the character described which includes a hydraulically operated discharge valve to control discharge of hot water from the water tank of the machine, the discharge valve being controlled by operation of the water inlet system so that while cold water is flowing into the tank the valve remains closed to prevent discharge of hot water therefrom.

It is a further object of the invention to provide, in a beverage brewing machine of the character described, positive safety means for preventing entry of cold water into the water tank in the event of a malfunction in the normal water inlet system.

Yet a further object of the invention is to provide, in a beverage brewing machine of the character described, a flow restrictor in the water inlet system to insure that the water flows into the water tank in a substantially uniform time period regardless of pressure changes in the inlet source of water.

Still a further object of the invention is to provide an automatic beverage brewer of the character described, wherein the water inlet control system is effective to automatically supply sufficient make-up water to replace that which may have evaporated because the machine was idled over an extended time period.

Generally, an automatic system for a beverage brewer includes means for introducing a predetermined quantity of cold water to a water tank, heating the water in the tank and delivering the heated water to a spray or discharge head to be sprayed or discharged over a predetermined amount of beverage producing material, whereby an extract of the material is brewed and delivered to a beaker or the like for consumer usage.

In accordance with one aspect of the invention, there is provided an automatic beverage brewing machine for brewing coffee or the like, the machine including a water tank having a side wall and a bottom wall and a top wall. Thermostatically controlled heating means is disposed within the water tank for heating and maintaining water therein at a beverage brewing temperature. Discharge means is associated with the water tank for discharging hot water therefrom and means is provided for receiving a beverage producing material to be covered by hot water from the discharge means. The automatic machine also includes means for introducing cold water into the tank to cause hot water in the tank to be discharged therefrom in an amount corresponding to the amount of cold water introduced thereto; valve means being associated with the discharge means to prevent discharge of hot water from the water tank until the water therein reaches a predetermined level. In accordance with the invention, the valve means is controlled by the water inlet means so that while cold water is being introduced into the tank the valve means prevents the discharge of hot water from the tank.

Further features of the invention pertain to the particular arrangement of the elements of the automatic beverage brewing machine, whereby the above-outlined and additional operating features thereof are attained.

The invention, both as to its organization and method of operation, together with further objects and advantages thereof, will best be understood by reference to the following specification when taken in connection with the accompanying drawings, in which.

Figure 1:
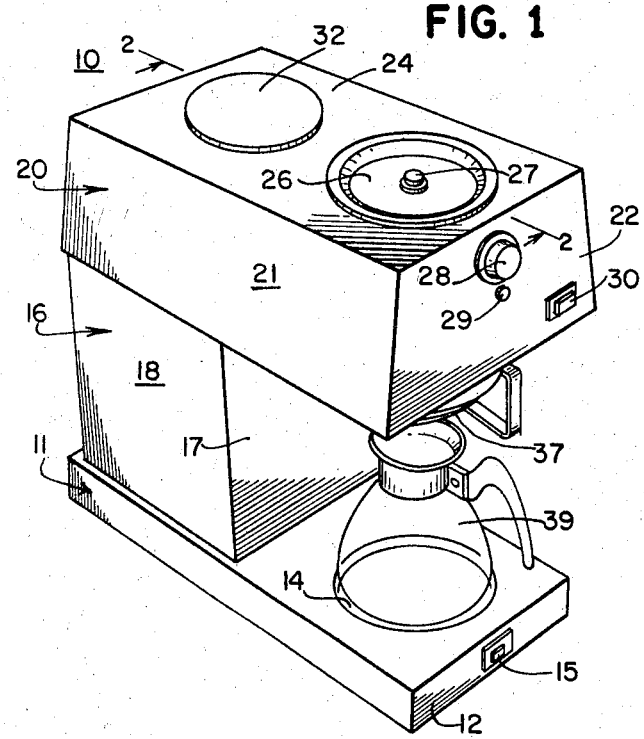
FIGURE 1 is a perspective view of an automatic beverage brewing machine embodying the present invention.
Figure 3:
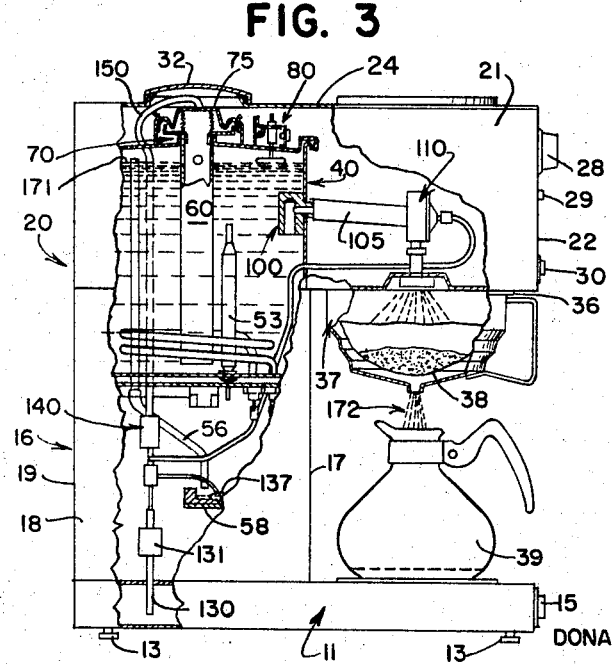
FIG. 3 is an enlarged elevational view of the beverage brewing machine illustrated in FIG. 1, with parts thereof broken away and diagrammatically illustrating the operation of the machine at the start of a brewing cycle with hot water flowing through the discharge outlet and the discharge head above the brew basket.
Figure 2:
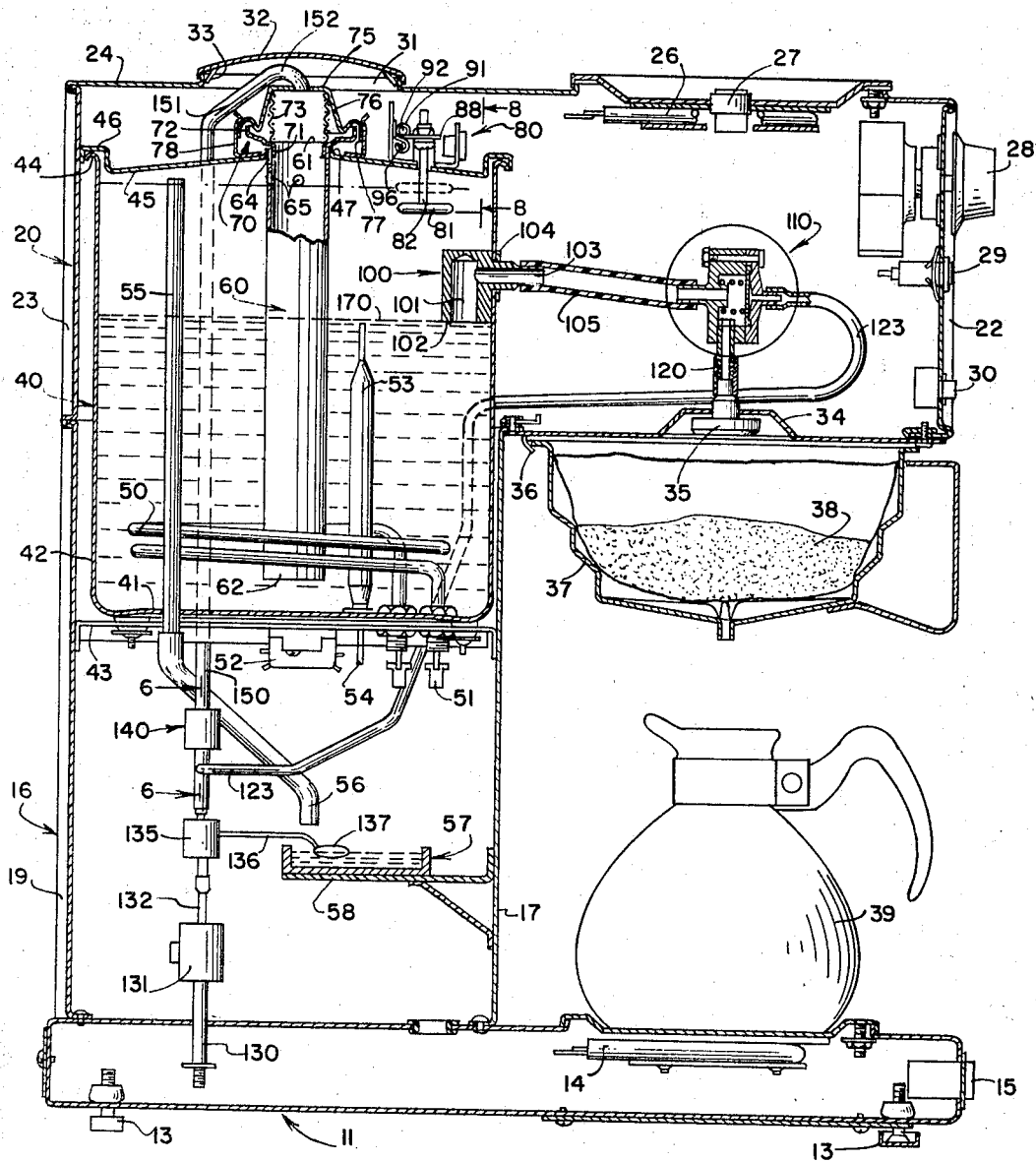
FIG. 2 is an enlarged view in vertical section of the beverage machine of the present invention taken along the line 2—2 of FIG. 1, and illustrating the beverage brewing machine preparatory to a brewing cycle with the water tank partially full and a beverage producing material in the basket provided therefor.

Referring now to the drawings and more particularly to FIGS. 1 through 3 thereof, there is illustrated an automatic beverage brewing machine 10 which may be used for brewing coffee or the like. The beverage brewing machine 10 includes a generally rectangular base portion 11 having a forward control panel 12. A plurality of adjustably mounted legs 13 is provided in the base 11 for properly seating the machine on a counter top or the like.

A lower heating unit 14 is provided on the upper surface of the base 11 and is disposed adjacent the front end thereof. The lower heating unit 14 is adapted to receive an associated liquid receiving beaker thereon. A lighted switch 15 is provided on the control panel 12 for controlling operation of the lower heating unit 14.

The machine 10 further includes a lower housing designated generally as 16, defined by an upstanding front wall 17, a pair of side walls 18 and a rear wall 19. An upper housing 20 is mounted on the lower housing 16 and includes the forwardly extending side walls 21, a front control panel 22, a rear wall 23, a top wall 24 and a bottom wall 25. As seen in the drawings, the upper housing 20 is coextensive in length to the base 11.

The top wall 24 of the upper housing is provided with an upper heating unit 26 disposed substantially adjacent to the front end thereof. The upper heating unit 26 is provided with a centrally disposed thermal-responsive switch 27, a manual control switch 28 being provided on the front control panel 22 for controlling operation of the heating unit 26. A pilot light 29 is also provided on the front panel 22 and is energized when the switch 28 is in an "on" position. A cycle control switch 30 is also provided on the front panel 22 of the upper housing, depression of the switch 30 effecting operation of the machine in the manner hereinafter described.

The top wall 24 of the upper housing 20 is further provided with an opening therein defined by an annular flange 31 (FIG. 2) which opening is normally closed by a domed cover 32 having internally arranged clips 33 to hold the cover 32 in place.

The bottom wall 25 of the upper housing 20 is provided with a raised portion 34 within which is disposed a discharge head 35, the discharge head being connected to the hot water discharge system as hereinafter described.

The bottom wall 25 is also provided with a pair of longitudinally extending slides 36 (one only being shown), the slides 36 being provided to operably position a brew basket 37 below the discharge head 35. In operation, the brew basket 37 is provided with a filter paper cup containing the beverage producing material, in this case ground coffee as shown at 38. An associated beverage receiving beaker 39 is disposed on the lower heater 14 below the brew basket to receive the coffee extract flowing therefrom, as best seen in FIG. 3. The discharge head 35 and the brew basket 37 may be of the type illustrated and described in the copending application of Reynolds et al., Ser. No. 668,384, filed Sept. 18, 1967, for Beverage Brewing Machine, and assigned to the same assignee as the present application.

The upper and lower housings 16 and 20 cooperate to provide an enclosure for a water tank 40. The water tank 40 includes a bottom wall 41 and a cylindrical side wall 42, the tank 40 being disposed upon a partition 43 which is provided in the lower housing 16. The upper end of the water tank 40 is provided with an outwardly turned annular lip 44. A cover 45 is disposed over the tank 40, the cover having a downwardly extending annular channel 46 formed thereon about the periphery thereof adapted to cooperate with the annular lip 44 on the water tank 40, thereby to prevent lateral movement of the cover 45 relative to the water tank 40. The cover 45 is provided with a centrally disposed and upwardly extending annular flange 47 which defines a centrally disposed opening therein adapted to receive the upper end of an upstanding tube 60 as hereinafter described.

A heating coil 50 is disposed within the water tank 40 substantially adjacent to the bottom wall 41 thereof, the terminals 51 of the heating coil 50 extending through the bottom wall 41 of the water tank and the partition 43 in the lower housing for connection with suitable conductors (not shown) to a terminal block 52 carried below the partition 43. A temperature responsive element or thermostat 53 is disposed within the water tank 40, the lower end 54 of the thermostat 53 extending through aligned openings in the bottom wall 41 of the tank and the partition 43 for connection to a tank thermostat switch (not shown) in a conventional manner. The arrangement is such that water in the water tank 40 is constantly maintained at an elevated temperature. This makes it possible to promptly draw off a supply of hot water from the water tank for the purpose of making coffee extract in the manner to be described.

An overflow pipe 55 is also provided in the tank 40, the upper end of the pipe 55 being disposed at a predetermined maximum permissible water height within the tank. The pipe 55 extends through the bottom wall of the tank and the partition 43, where it is connected by a flexible conduit 56 for discharge into an overflow tank 57, the overflow tank 57 being supported upon a partition 58 in the lower housing 16. If the overflow water in the overflow tank 57 reaches a predetermined height therein, the inlet water to the tank is completely shut off in a manner hereinafter described.

In accordance with the invention, provision is made for automatically displacing a predetermined quantity of hot water from the upper portion of the water tank 40 by introducing an equal amount of water, preferably cold water, in the lower portion of the water tank; the upstanding tube 60 being provided for this purpose. The upper end 61 of the tube 60 is provided with a plurality of nibs (not shown) adapted to engage the upstanding annular flange 47 of the cover 45, whereby the tube 60 is removably carried by the cover.

The tube 60 extends downwardly within the tank 40, the lower end 62 thereof terminating near the bottom wall 41 of the tank. The upper end of the tube 60 is provided with a generally rectangular notch 64 which begins below the cover 45 and extends upwardly beyond the flange 47. The notch 64 places the interior of the water tank 40 in direct communication with atmosphere and provides for the escape of air from the upper end of the water tank 40 when hot water within the tank is upwardly displaced therein in response to the pouring of cold water through the tube 60. The upper end of the tube 60 is also provided with a plurality of openings 65 therein which permit the discharge of air from the tank and also permit water to flow out of the tube 60 and directly into the tank in the event water floods the tube and is prevented from entering the tank through the lower end of the tube.

In a typical construction of the tube 60, the tube itself is formed of stainless steel and is approximately 8⅝ inches long and it has an outer diameter of approximately 1¼ inches, the wall thereof being approximately .035 inch thick. The openings 65 are approximately ¼ inch in diameter with the centers thereof being disposed approximately 13/32 of an inch below the upper end of the tube. The relatively large diameter of the tube provides twofold advantages: (1) it permits rapid introduction of the cold water to the bottom of the tank without great turbulence and (2) any liming effect or buildup of scale on the inner wall will not interfere with the flow of incoming water as is the case where a tube having a small diameter is used.

With continued reference to FIG. 2, it will be seen that the upper end of the tube 60 receives a tray like member 70, the member 70 having an inner downwardly turned annular flange 71 which resides within the upper end 61 of the tube 60. The member 70 has an upwardly directed flange 72 formed as the outer periphery thereof.

A cylindrical screen 73 is seated upon the member 70 and extends upwardly therefrom, the screen 73 serving as a filter to prevent loose material from being carried into the tube 60. An inlet cover 75 is mounted on the upper end of the screen 73, the inlet cover 75 including a side wall 76 extending downwardly toward the member 70 and having a serpentine flange 77 about the outer periphery thereof, the upwardly directed flange 72 on the member 70 being spaced from the flange 77 because of the screen 73. The inlet cover 75 is held in position on the screen 73 by a pair of spring clips 78 which are appropriately connected at diametrically disposed positions to the tank cover 45.

The spaced flanges 72 and 77 of the tray member 70 and the inlet cover 75 permit air to flow therebetween, whereby the screen 73 serves as an air break for the inlet water system to prevent back siphonage into the inlet water line in the event of a malfunction therein, such air break being required by virtually all local ordinances.

Figure 7:
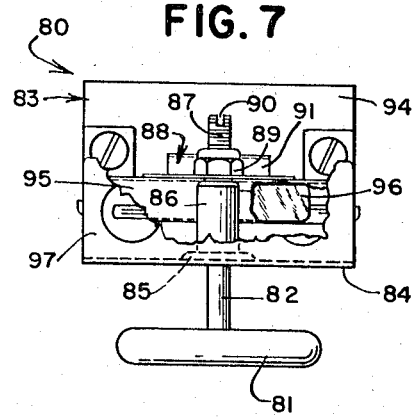
FIG. 7 is an enlarged sectional view of the float actuated switch mechanism taken along the line 7—7 in FIG. 2.

Still referring to FIG. 2, it will be seen that the cover 45 for the tank is also provided with a float actuated switch mechanism designated generally as 80, the details of which are illustrated in FIG. 7. The float actuated switch mechanism 80 includes a float 81 disposed within the tank 40 and having an upwardly extending float stem 82 secured thereto, the float stem 82 extending through an opening provided therefor in the tank cover 45.

A generally U-shaped bracket 83 is rigidly affixed to the cover 45, the central portion 84 thereof having an embossed flat 85 with an opening therein, a longitudinally extending bushing 86 being rigidly disposed within the opening. The bushing 86 has a longitudinal passage therethrough which receives the float stem 82 and permits reciprocal movement of the float stem 82 therein. The float stem 82 has a shoulder provided thereon (not shown) above which the remainder of the stem is threaded as at 87. A bracket 88 having an opening (not shown) therethrough is disposed on the stem. The bracket 88 is staked to the bottom of a lock nut 89 which is disposed on the threaded portion 87 of the stem 82, whereby the bracket 88 moves with the lock nut 89.

When the float 81 rises, the lock nut 89 on the steam 82 rises therewith, causing the bracket 88 also to rise therewith. When the float descends, the lock nut 89 carrying the bracket 88 causes the bracket to move downwardly therewith until the bracket engages the upper end of the bushing 86. The upper end of the stem 82 has a slot 90 therein whereby the stem 82 may be adjusted relative to the nut 89, whereby the input quantity of water to the machine can be adjusted.

As seen in FIG. 2, the major portion of the bracket 88 is disposed substantially normal to the stem 82, the outer end of the bracket being bent to provide a holding flange 91 within which is disposed a horizontally extending magnet 92. The upstanding arm 94 of the bracket 83 has a bracket 95 thereon within which is disposed a reed switch 96. The reed switch 96 is preferably encapsulated to protect the glass enclosure of the reed contacts. The switch has two terminals (not shown) extending laterally outwardly therefrom, for connection to suitable conductors which are connected to the other upstanding leg 97 of the bracket 83. The reed switch 96 may be of the type manufactured by Hamlin, Inc. as their switch No. MRL-2.

In operation, as the hot water rises within the tank 40 and engages the float 81, the float 81 will also rise within the tank causing the stem 82 to rise within the bushing 86, the threaded portion thereof raising the bracket 88 and the magnet 92 contained therein. When the magnet moves about ½ inch above the reed switch 96, the reeds therewithin will separate and thereby break the circuit through the switch. As the water level in the tank drops and the float 81 descends therein, the magnet 92 will approach the reeds of the reed switch 96, and, when the magnet is approximately ¼ inch away, the magnetic force thereof will cause the reeds to close and again complete a circuit through the switch 96. The float actuated switch mechanism 80 is provided to control an electrically operated water inlet valve for the machine in a manner hereinafter described, suffice it to say for now that when the switch 96 is opened it breaks a circuit for the water inlet valve and terminates the input of cold water to the water tank.

The hot water discharge system for the machine is best seen in FIG. 2, wherein it is seen that the side wall 42 of the water tank 40 is provided with an opening therein which is disposed substantially below the upper end of the water tank and is adapted to receive and support a discharge block 100 therein, hot water being delivered from the tank 40 through the discharge block 100.

The discharge block 100 includes a vertically disposed passage 101 extending upwardly from the bottom surface 102 of the block and terminating as a discharge outlet 103 disposed normal to the passage 101. The discharge outlet 103 extends through the opening in the side wall of the water tank 40, a rubber gasket 104 being disposed about the discharge outlet 103 where it passes through the opening thereby to prevent water from leaking therebetween.

One end of a discharge line 105 is connected to the discharge outlet 103 of the block 100, the other end thereof being connected to a first inlet of a discharge valve 110, the discharge outlet from the valve 110 being connected to the discharge head 35. As illustrated, the discharge head 35 is mounted in spaced relation to the water tank 40 and is disposed below the discharge block 100 in the side wall of the water tank, the discharge head 35 being located below the upwardly deformed portion 34 of the bottom wall 25 of the upper housing 20.

It will be understood that upward displacement of hot water within the tank 40 causes hot water to rise in the passage 101 until it reaches the discharge outlet 103, at which time hot water will flow through the discharge block 100, the discharge line 105, the discharge valve 110 (when open) and the discharge head 35 until the water level in the water tank drops below the lower surface 102 of the discharge block. When the water level drops below the lower surface 102 of the discharge block as indicated at 170 in FIG. 2, the passage 101 of the discharge block provides an air gap between the discharge outlet 103 and the bottom surface 102 thereof which prevents the drawing off of additional water from the water tank 40. The lowest portion of the discharge outlet 103 and the lower surface 102 of the block are sufficiently spaced so that the passage 101 accommodates the expansion of cold water being heated in the tank without drippage thereof through the discharge outlet 103.

In a typical construction of the discharge block 100, the block itself is made of brass, the passage 101 has an inner diameter of approximately 9/16 inch, the discharge outlet 103 and the discharge line 105 each have an inner diameter of approximately 3/8 inch, and the lowest portion of the discharge outlet 103 is disposed about 3/4 of an inch above the bottom surface 102 of the block. The passage 101 is formed of a larger diameter than the discharge outlet 103 to insure that a full stream of hot water enters the outlet 103, whereas if the passage 101 and the outlet 103 were of complementary diameters, it is possible that air bubbles might be entrained therein.

The discharge block 100 is suitably positioned in the side wall 42 of the water tank so that the volumetric capacity of the water tank 40 between the lower surface 102 of the discharge block and the actuated position of the float is sufficient to receive at least about 60 ozs. of water when the hot water in the water tank is displaced to the upper portion of the tank, as indicated at 171 in FIG. 3; the volumetric capacity of the tank 40 below the discharge block 100 being about 6 quarts of water. By adjusting the float stem 82 in the manner heretofore described, the capacity of the upper portion of the tank can be varied by approximately ±6 ozs.

The upper portion of the water tank above the discharge block 100 is intended to have a capacity corresponding to that of the associated beaker 39, whereby the introduction of a predetermined quantity of cold water into the water tank 40 will cause a substantially equal amount of hot water to be upwardly displaced therein and ultimately discharged as a beverage extract into the beaker 39, as illustrated diagrammatically at 172 in FIG. 3.

As noted, the discharge line 105 is connected through the discharge valve 110 to this discharge head 35, the discharge head 35 being adapted to spray hot water in a plurality of streams at substantially uniform flow rates and in a particular overall pattern over the material 38 in the brew basket 37, the head 35 being illustrated and described in the aforementioned copending application Ser. No. 668,384, filed Sept. 18, 1967, entitled Beverage Brewing Machine.

Figure 4:
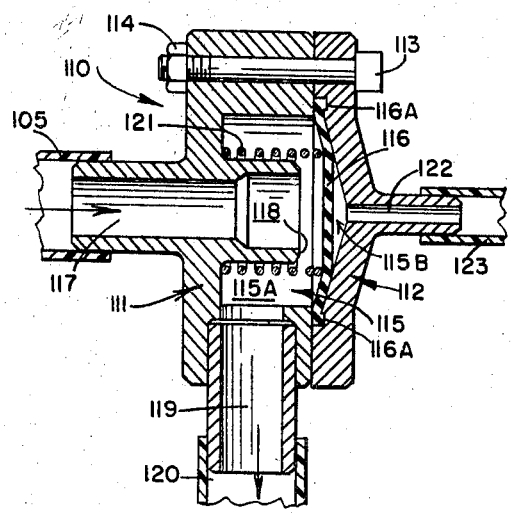
FIGS. 4 and 5 are enlarged views of the encircled area of FIG. 2, illustrating the construction of the hydraulically operated discharge valve in greater detail.
Figure 5:
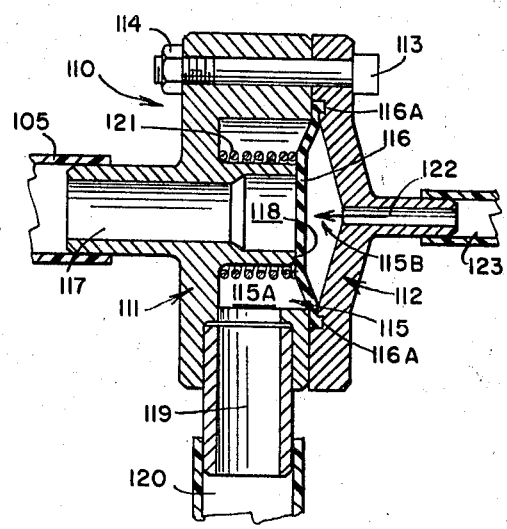

The discharge valve 110 for controlling discharge of hot water from the tank 40 is best illustrated in FIGS. 4 and 5 and includes a pair of generally circular and mating molded plastic members 111 and 112, secured together by a plurality of circumferentially spaced bolts 113 and fastening nuts 114 (one only being shown). The mating members 111 and 112 are generally concave and cooperate to provide a chamber 115 therebetween. A flexible diaphragm 116 is disposed between the mating members 111 and 112 and divides the chamber 115 into two subchambers 115A and 115B, disposed respectively on the left and right hand sides of the diaphragm 116. The diaphragm has a peripheral bead 116A thereon which is seated in a complementary groove in the right hand member 112.

The left hand member 111 is provided with an annular inlet passage 117 which includes a cylindrical inner end portion 118 that extends into the subchamber 115A. The left hand member 111 is also provided with a tubular outlet passage 119 from the chamber 115A, the outlet passage being connected by a flexible conduit 120 to the inlet end of the discharge head 35. As seen in FIG. 4, a compression spring 21 is disposed about the inner end portion 119 of the inlet passage and operates to bias the diaphragm 116 to the right as shown in FIG. 4. The right hand member 112 is also provided with an integrally formed tubular inlet passage 122 which receives cold water through a conduit 123 which in turn is connected to the water inlet system as hereafter described, the cold water passing into the subchamber 115B to apply pressure to the right side of the diaphragm 116.

When the discharge valve 110 is in the normal "open" position, with the diaphragm 115 to the right as shown in FIG. 4, hot water may flow from the water tank through the discharge block 100, the discharge line 105, into the inlet passage 117 and the inner end portion 118 thereof and into subchamber 115A, out of subchamber 115A via outlet passage 119 and flexible conduit 120 to the inlet of the discharge head 35, whereupon it will be sprayed therefrom over the coffee ground in the brew basket 37.

The discharge valve 110 is operable to a "closed" position when the diaphragm 116 is biased to the left, as shown in FIG. 5, at which time the diaphragm 116 seals off the inner end portion 118 of the inlet passage 117 and thereby prevents the flow of hot water therethrough. The discharge valve is operated to the "closed" position thereof by the pressure of the cold water flowing through conduit 123 and inlet passage 122, such pressure being developed by the inlet water system in the manner hereinafter explained.

In a typical construction the discharge valve 110 may be made of a plastic sold under the trade name Norel; the outer diameter of the left and right hand mating members being approximately 1¾ inches. The inlet passage 117 in the left hand member 111 is approximately 3/8 inch in diamter; the inner end portion 118 thereof being approximately 7/16 inch in diameter and extending inwardly approximately .407 inch from the wall of the member 111 (the inner end being spaced approximately .093 of an inch from the mating surface of the member 111). The outlet passage 119 is approximately 3/8 of an inch in diameter; the chamber 115 formed by the mating housings 111 and 112 is approximately .937 of an inch in diameter, and the inlet passage 122 in the right hand member 112 is approximately .093 of an inch in diameter.

The water inlet system for the machine is schematically illustrated in FIGS. 2 and 3, and includes a water supply line 130 which is adapted to be connected to an available source of cold water. The supply line 130 is connected to the inlet side of an electrically controlled valve 131, the outlet of the valve 131 being connected through a conduit 132 to the inlet of a normally open mechanically operated valve 135. The valve 131 may be of the type sold by Dole Valve Company as their model N–42, while the mechanical valve 135 may be of the type sold by Maid-O-Mist as their model No. 6905.

As best seen in FIG. 2, the mechanical valve 135 is operatively connected by an arm 136 to a float 137 disposed within the overflow tank 57. The valve 135 is intended to operate as a safety valve to positively prevent the introduction of cold water to the water tank in the event of a malfunction of either the electrically operated valve 131, or some other component of the system, which malfunction would cause the continued overflow of water from the tank 40 through the overflow pipe 55 and cause the water in the overflow tank 57 to reach a maximum predetermined level therein, thereby causing the valve 135 to close.

Figure 6:
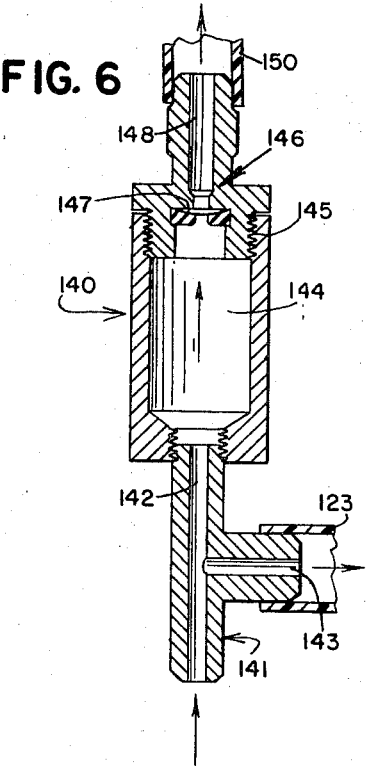
FIG. 6 is an enlarged sectional view of the flow restrictor taken along the line 6—6 in FIG. 2.

The outlet of the mechanically operated valve 135 is connected to the inlet of a flow restrictor 140 by a T-shaped fitting 141. The fitting 141 is threadably connected to the inlet side of the flow restrictor 140; the fitting 141 having a longitudinal flow passage 142 connecting the outlet of the valve 135 to the flow restrictor (FIG. 6). The fitting 141 also has an outlet passage 143 in communication with the flow passage 142, the outlet passage 143 being connected by the tubular conduit 123 to the inlet passage 122 of the discharge valve 110.

The flow restrictor 140 has a chamber 144 therein, the outlet end 145 of the chamber 144 receiving a nipple 146 therein. The nipple 146 is provided with a flow control member 147 disposed at the chamber outlet, the nipple 146 having an outlet passage 148 leading therefrom. The flow control member 147 serves to regulate the output flow of water through the flow restrictor 140 to a relatively uniform flow rate of approximately one gallon per minute, regardless of the inlet water pressure through the passage 142 to the chamber 144. The flow restrictor may be of the type manufactured by Dole Valve Company as their model No. M-38.

The outlet end 148 of the nipple 146 has a conduit 150 connected thereto, the conduit 150 extending upwardly from the flow restrictor 140 above the water tank 40. The upper end of the conduit 150 is bent as at 151 to provide the downwardly directed portion 152 which is disposed within an opening in the inlet cover 75, thereby to discharge cold water into the upper end of the tube 60 where it flows by gravity to the lower end of the tank 40.

When cold water flows through the passage 142 and into the inlet chamber 144 of the flow restrictor, the flow control member 147 causes the water to be discharged at a fairly uniform flow rate regardless of the incoming pressure to the chamber 144. When the pressure of the incoming water to the chamber exceeds that which can flow directly through the flow control member 147, back pressure is developed by the control member 147. The back pressure developed by the flow control member 147 causes some of the entering cold water to be diverted through the T passage 143, which passage is connected by the conduit 123 to the water inlet passage 122 of the discharge valve 110. The pressure of the water flowing into the chamber 115B of the discharge valve 110 through the passage 122 thereof causes the diaphragm 116 to move to the "closed" position thereof as illustrated in FIG. 5.

A pressure of approximately 4 p.s.i. is required to hold the diaphragm 116 in the "closed" position thereof. This pressure will be developed when the line pressure to the flow restrictor is approximately 15 p.s.i., whereby the minimum operating pressure for the machine using components of the type herein described is approximately 15 p.s.i. The back pressure created by the flow control member 147 increases in direct ratio to the increase in line pressure to the flow restrictor, the back pressure through the passage 143 being only slightly more than one third of the line pressure to the flow control member for all line pressures over 15 p.s.i.

In addition to providing the back pressure which controls the discharge valve 110, the flow restrictor also insures that the water will flow into the water tank at a substantially uniform rate, whereby the water inlet cycle for the machine 10 will be relatively constant. The flow restrictor 140 also prevents flooding of the tank where the inlet supply of water is at a high pressure.

The water inlet system and the hot water discharge system cooperate to admit only a predetermined quantity of water to the tank 40. In operation, when the electrically controlled valve 131 is energized, cold water flows through the supply line 130, the valve 131, conduit 133, mechanical valve 135 and passage 142 into the flow restrictor 140, wherein the back pressure created by the flow control member 147 causes some of the incoming water in the passage 142 to flow through the T passage 143 and thence through the flexible conduit 123 so that it impinges upon and applies a constant pressure to the flexible diaphragm 116 in the discharge valve 110, the pressure being sufficient to cause the diaphragm 116 to move to the "closed" position thereof as shown in FIG. 5.

Concurrently with the closing of the discharge valve 110, cold water also flows out of the flow restrictor 140 through the flow control member 147 and the passage 148 to the inlet conduit 150, whereupon it is discharge through the inlet cover 75 into the upper end of the upstanding tube 60. The incoming cold water flows downwardly through the tube 60 to the bottom of the tank and causes hot water contained therewithin to be upwardly displaced within the tank. As the hot water in the water tank rises some of it will flow through the discharge block 100, the discharge line 105 and into the inlet passage 117 of the discharge valve 110. However, the pressure of the water flowing through the discharge head 100 is only equal to the head pressure of that water within the water tank which is disposed above the discharge block 100. The head pressure of the water and the force of the compression spring 121 on the left side of the diaphragm 116 are substantially less than the pressure of the cold water flowing through conduit 123 and against the right hand side of the diaphragm 116, whereby the diaphragm 116 remains closed and prevents the discharge of hot water through the valve 110 and the discharge head 35.

Because the hot water is prevented from flowing out of the water tank 40 by the discharge valve 110 while the inlet valve 131 is open, cold water continues to flow into the bottom of the tank causing the hot water in the tank to rise until it raises the float 81, as illustrated in FIG. 3. The float stem 82 also rises and lifts the magnet 92 carried thereby away from the reed switch 96, whereby the switch 96 opens to break the electrical circuit to the valve 131 and thereby close same to prevent further introduction of cold water to the tank.

When the valve 131 closes, the back pressure developed by the flow restrictor 140 terminates and relieves the water pressure against the right side of the diaphragm 116, whereby the head pressure of the hot water and the force of the spring 121 on the left side of the diaphragm 116 cause the diaphragm to move to its normally open position shown in FIG. 4, at which time the hot water can flow through the valve 110 via the discharge passage 119, through the conduit 120 and through the discharge head 35 and over the coffee grounds disposed in the brew basket 37. The water will continue to flow out of the discharge head until the water level within the tank drops to just below the bottom surface 102 of the discharge block 100, as indicated at 170 in FIG. 2, the air drawn into the tank through the notch 64 and the openings 65 in the upper end of the tube 60 providing an air gap in the passage 101 so that the flow of hot water from the water tank positively terminates.

As heretofore noted, discharge of hot water from the tank 40 terminates when the water reaches the level 170 illustrated in FIG. 2. Because the bottom surface 102 of the block 100 is disposed below the discharge outlet 103 therein, the standby level of water within the tank 40 is normally disposed below the discharge outlet 103, and, as previously described, the distance between the discharge outlet 103 and the bottom surface 102 of the block 100 is sufficient to accommodate expansion of the cold water within the tank upon the heating thereof to prevent drippage of water through the discharge outlet 103.

Figure 8:
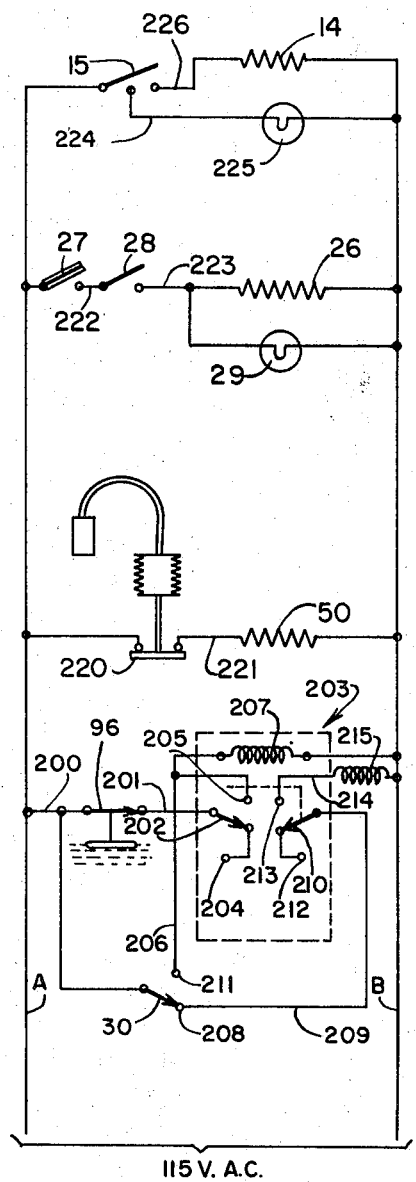
FIG. 8 is one form of electrical circuit which may be employed with the beverage brewing machine disclosed herein.

Referring now to FIG. 8, there is shown a typical electrical circuit for the beverage brewing machine 10, the input to the electrical circuit of FIG. 8 being on a pair of line conductors designated as A and B and connected through suitable switches and fuses (not shown) to a suitable 115 volt 60 cycle A.C. supply.

As illustrated, a branch conductor 200 is connected to the line conductor A, the conductor 200 being connected to a first terminal of the float actuated reed switch 96, the second terminal of the switch 96 being connected through a conductor 201 to one terminal of a first switch 202 of a double pole, double throw relay, designated generally as 203. The switch 202 is normally disposed in the position shown in FIG. 8 wherein it contacts a dead terminal 204 in the relay 203. When the relay is energized as hereinafter described the switch 202 is caused to move to a second position thereof wherein it engages a contact 205 of the relay 203, the contact 205 being connected through a conductor 206 to a first terminal of the relay coil 207, the second terminal of the relay coil 207 being connected to the line conductor B, thereby to provide a holding circuit through the relay.

The branch conductor 200 is also connected to one terminal of the manually operated switch 30, the switch 30 having two operative positions. The switch 30 is normally in the position shown in FIG. 8 where it engages contact 208 thereof, contact 208 being connected by the conductor 209 to one terminal of a second switch 210 in the relay 203.

When the switch 30 is depressed by the operator it momentarily engages the second contact 211 thereof which is connected through conductor 206 to the coil 207 as previously described, whereby depression of the switch 30 causes the relay 203 to be energized, causing switch 202 therein to close and provide the holding circuit for the relay.

The second switch 210 in the relay is normally in the position shown in FIG. 8, wherein it engages a dead contact 212 in the relay; energization of the relay 203 causing the switch 210 to move to a second position thereof wherein it engages contact 213 in the relay, contact 213 in the relay being connected by a conductor 214 to the coil 215 of the solenoid operated water inlet valve 131, the second terminal of the coil 215 being connected to the line conductor B.

When the switch 30 is closed to engage contact 211, a completed circuit is provided through the line conductor A, conductor 200, switch 30, conductor 206, relay coil 207 and line conductor B. At this time the relay 203 is energized and causes switches 203 and 210 to engage contacts 205 and 213 respectively. When the relay 202 is energized a holding circuit therefor is completed through conductor 200, float operated switch 96, conductor 201, switch 202, contact 205, conductor 206, relay coil 207 and line conductor B.

The switch 30 is a momentary type switch which is normally spring biased so that after it completes the circuit through conductor 200 it returns to the position shown in FIG. 8. At this time a circuit is also completed through conductor 200, switch 30, conductor 209, switch 211, contact 215, conductor 214 and the coil 215 for the valve 131, whereby cold water is allowed to flow through the water inlet system as previously described.

When the hot water in the water tank reaches the maximum predetermined level therein the float actuated switch 96 opens to deenergize relay 203, thereby causing the switch 210 to engage the dead contact 212 in the relay and thus deenergize the coil 215 to prevent further introduction of cold water to the hot water tank.

Also as illustrated, the conductor A is connected to one terminal of a tank thermostat switch 220, the other terminal of the thermostat switch 220 being connected through a conductor 221 to one terminal of the heating coil 50 for the water tank 40. The second terminal of the coil 50 is connected to the conductor B. The operation of the heating unit 50 under control of the thermostat switch 220 is fairly conventional, the switch 220 being closed to provide a circuit through the heating coil 50 when the temperature of the water within the tank drops below a preselected value.

As previously noted, the upper heating unit 26 is controlled by both a thermostatically controlled switch 27 and a manual switch 28, one terminal of the switch 27 being connected to the main conductor A and the other terminal thereof being connected to a conductor 222 which in turn is connected to one terminal of the manually controlled switch 28. The other terminal of the manual switch 28 is connected to a conductor 223, one terminal of the pilot light 29 being connected to one branch of the conductor 223 and the upper heating unit 26 also having one terminal connected to the conductor 223. The other terminal of the pilot light 29 is connected to the line conductor B; similarly, the other terminal of the heating element 26 is also connected to the line conductor B.

The upper heating unit 26 is used to maintain a previously brewed beaker of coffee at a predetermined temperature. In operation, the beaker containing the brewed coffee is placed on the upper heating unit 26, and the manual control switch 28 is closed. If the brewed beverage within the beaker is already at the predetermined temperature, the thermostatically controlled switch 27 will remain open so as to open the circuit through the heating element 26, the switch 27 remaining open so long as the beverage is at the predetermined temperature. As the beverage within the beaker cools below the predetermined temperature, the thermostatically controlled switch 27 closes to complete the circuit through the line conductor A, the switch 27, the conductor 222, the switch 28, the conductor 223, the upper heating unit 26, the pilot light 29 and the line conductor B, thereby to energize the heating unit 26 so as to heat the beverage within the beaker. When the temperature of the beverage in the beaker reaches the predetermined value, the thermostatically controlled switch 27 opens to break the circuit and deenergize the heater 26. The preferred temperature at which the beverage should be maintained by the heating unit 26 is $175°\pm5°$ F.

One terminal of the switch 15 for the lower heater 14 is also connected to the main conductor A, a second terminal of the switch 15 being connected through a conductor 224 to one terminal of a light 225, the second terminal of the light 225 being connected to the line conductor B. A third terminal of the switch 15 is connected through a conductor 226 to one terminal of the heating element 14, the other terminal of the heating element 14 being connected to the main conductor B, whereby closing of the switch 15 causes both the heating element 14 and the light 135 to be energized.

In operation, it will be assumed that the water tank 40 is initially filled with water to the level indicated at 170 in FIG. 2 and that the tank heater 50 under the control of the tank thermostat 53 is energized to bring the water within the tank to a predetermined temperature, the thermostat switch 220 being closed and opened in such manner as to maintain the temperature of the water in the water tank 40 in the neighborhood of $193°\pm5°$ F.

When it is desired to cause coffee extract to flow into the beaker 39 the latter is positioned on the heating element 14 and the control switch 15 is closed to energize the heating element 14 and also to cause the indicating light 225 for the switch to be energized. A supply of fresh ground coffee is placed in a cup of filter paper within the brew basket 37. The basket 37 is then inserted below the discharge 35.

The manual cycle control switch 30 is then momentarily depressed causing the relay 203 to be energized in the manner heretofore described, energization of the relay causing the switch 210 therein to complete a circuit through the coil 215 of the inlet valve 131 and thereby causing cold water to flow through the water inlet valve 131, the machanically controlled valve 135, the flow restrictor 140 and through the water inlet line 150 into the upper end of the tube 60. The cold water flows directly through the tube 60 into the lower portion of the water tank 40 thereby causing hot water contained therein to be upwardly displaced in the tank 40.

Concurrently therewith, the flow restrictor 140 develops a back pressure which causes some of the entering cold water to flow through the conduit 123 to the inlet 122 of the discharge valve 110, the inlet water pressure causing the diaphragm 116 in the valve 110 to move to the closed position as illustrated in FIG. 5. When the valve 110 is in closed position thereof hot water is prevented from discharging from the water tank 40 through the discharge block 100.

As the hot water continues to rise in the water tank 40, the float 81 will eventually rise therewith until such time as the magnet 92 carried by the bracket 88 moves sufficiently far away from the reed switch 96 to permit the reed switch to open, thereby deenergizing the relay 203 and the coil 215 for the water inlet valve 131.

When the water inlet valve 131 is deenergized and the inlet flow of water terminated, there is no longer back pressure developed by the flow restrictor 140, whereby the force of the spring 121 and the head pressure of the hot water in the inlet passage 117 are sufficient to cause the diaphragm 116 to move to the discharge position thereof as illustrated in FIG. 4, at which time hot water can flow through the discharge block 100, the discharge line 105, the discharge valve 110 and the discharge head 35 to be sprayed over the ground coffee in the brew basket 37, until all of the hot water in the upper portion of the water tank flows out of the discharge water line and the water level in the water tank reaches the standby position 170 therein, at which time the brewing cycle is completed.

Using a tank having a "fill" capacity of approximately 60 ozs. and using a flow restrictor which introduces water to the tank at the rate of approximately one gallon per minute, it will take approximately 30 seconds to fill the tank with the predetermined quantity of cold water. It will then take approximately 2 minutes to discharge a like quantity of hot water from the tank through the discharge block, the discharge valve and the discharge head, and approximately another 1¼ minutes for the hot water to completely filter through the coffee grounds in the brew basket for discharge into the beaker, whereby the total elapsed time for a brewing cycle is approximately 3¾ minutes to 4 minutes.

It will be apparent from the foregoing that the discharge valve 110 and the float actuated switch mechanism 80 cooperate with the water inlet valve 131 in a unique manner, the discharge valve being operable in response to operation of the water inlet valve 131 to prevent discharge of hot water from the tank while the valve 131 is open to introduce cold water into the tank, whereupon upward displacement of hot water in the tank to a predetermined level therein is effective to close the inlet water valve.

Because the volumetric capacity of the tank between the lower end of the discharge block 100 and the actuating position of the float is substantially constant, only a predetermined quantity of cold water can be introduced to the machine during each cycle, and, because of the location of the discharge block in the tank side wall, only that predetermined quantity of cold water which is admitted to the tank will be discharged as hot water therefrom. By providing predetermined amounts of ground coffee 38 on the disposable filter cup in the brew basket 37 and by maintaining the temperature of the water in the water tank 40 at a predetermined value, it is possible to make the coffee extract under identical controlled conditions for each brewing cycle.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An automatic beverage brewing machine comprising, in combination, a water tank having a side wall and a bottom wall and a top wall, thermostatically controlled heating means disposed within said water tank for heating and maintaining water therein at a beverage brewing temperature, discharge means associated with said water tank for discharging hot water therefrom, means for receiving a beverage producing material to be covered by hot water from said discharge means, water inlet means for introducing cold water into said water tank to cause hot water in said tank to be discharged therefrom in an amount corresponding to a predetermined quantity of cold water introduced thereto, and means controlled by said water inlet means for preventing discharge of hot water from said water tank until the full predetermined quantity of cold water has been introduced into said water tank.

2. The beverage brewing machine set forth in claim 1, wherein said means for preventing discharge of hot water from said water tank comprises a valve.

3. The beverage brewing machine set forth in claim 2, wherein said valve is hydraulically operated.

4. An automatic beverage brewing machine comprising, in combination, a water tank having a side wall and a bottom wall and a top wall, thermostatically controlled heating means disposed within said water tank for heating and maintaining water therein at a beverage brewing temperature, a discharge outlet in said water tank, a discharge head mounted in spaced relation to said water tank, a discharge water line connecting said discharge outlet in said water tank and said discharge head, means disposed below said discharge head for receiving a beverage producing material to be covered by hot water from said discharge head, water inlet means for introducing cold water into said tank to cause hot water in said tank to be upwardly displaced therein for discharge through said discharge outlet and said discharge line and said discharge head and over said beverage producing material and thereby cause a beverage extract to flow into an associated beverage receiving beaker in an amount corresponding to a predetermined quantity of cold water introduced into said water tank, and valve means controlled by said water inlet means for preventing discharge of hot water from said water tank until the full predetermined quantity of cold water has been introduced into said water tank.

5. The beverage brewing machine set forth in claim 4, wherein said valve means is operative to prevent discharge of hot water from said water tank so long as cold water is being introduced into said water tank through said inlet means.

6. An automatic beverage brewing machine comprising, in combination, a water tank having a side wall and a bottom wall and a top wall, thermostatically controlled heating means disposed within said water tank for heating and maintaining water therein at a beverage brewing temperature, a discharge outlet in said water tank disposed above the bottom wall thereof, a discharge head mounted in spaced relation to said water tank, a discharge water line connecting said discharge outlet in said water tank and said discharge head, means disposed below said discharge head for receiving a beverage producing material to be covered by hot water from said discharge head, water inlet means including an electrically controlled valve for introducing cold water into said tank so as to cause hot water in said tank to be upwardly displaced therein for discharge through said discharge outlet and said discharge line and said discharge head in an amount substantially equal to the amount of cold water introduced thereinto, means for initiating operation of said electrically controlled valve so as to cause cold water to flow into said water tank through said water inlet means, means operative in response to upward displacement of water in said water tank to a predetermined level therein for terminating operation of said electrically controlled valve whereby said electrically controlled valve is operative only to introduce a predetermined quantity of cold water into said water tank, valve means having open and closed operative positions disposed in said discharge water line for controlling discharge of hot water therethrough, said valve means being operatively associated with said water inlet means and concurrently operative in response to operation of said electrically controlled valve, said valve means being operative to said closed position thereof so long as said electrically controlled valve is operating to allow cold water to enter said water tank whereby said valve means prevents discharge of hot water from said discharge outlet and said discharge line through said discharge head, said valve means being operable to said open position thereof upon termination of operation of said electrically controlled valve to allow hot water to flow through said discharge head and over said beverage producing material and thereby cause a beverage extract to flow into an associated beverage receiving beaker in an amount corresponding to that predetermined quantity of cold water introduced into said water tank.

7. The beverage brewing machine set forth in claim 6, wherein said means for terminating operation of said electrically controlled valve comprises an electrical switch, actuating means for controlling said switch, and a float member disposed within said water tank responsive to changes in the level of water therein for effecting movement of said actuating means.

8. The beverage brewing machine set forth in claim 7, wherein said electrical switch is a reed switch and said actuating means comprises a magnet for effecting operation of said reed switch.

9. The beverage brewing machine set forth in claim 6, wherein said valve means is hydraulically operated by the water flowing through said electrically controlled valve.

10. The combination set forth in claim 6, wherein said discharge outlet in said water tank is so disposed in the side wall of said water tank that the volumetric capacity of said water tank between the discharge outlet and the top of the water tank is sufficient to receive at least about 60 ozs. of water when the hot water in the water tank is displaced to the upper portion thereof.

11. The combination set forth in claim 6, and further comprising a discharge block disposed in said outlet in the side wall of said water tank, said discharge block having a vertically disposed passage extending upwardly from the lower surface thereof, said vertically disposed passage terminating in a discharge outlet disposed normal to said passage and extending through said outlet in said water tank, whereby hot water is adapted to flow through said discharge block until the water level in said water tank drops below the lower surface of said discharge block so that said vertical passage provides an air gap between said discharge outlet and the bottom surface of said discharge block so as to prevent the drawing off of additional water from said water tank, the lowest portion of said discharge outlet and the lower surface of said block being sufficiently spaced so that said vertical passage accommodates the expansion of cold water being heated in said tank without drippage thereof through said discharge outlet.

12. The beverage brewing machine set forth in claim 6, wherein said valve means comprises a hollow housing defining a compartment therein, closure means disposed in said housing and dividing said compartment into two two chambers, a first inlet opening in said housing for admitting water under pressure from said inlet means to one of said chambers, a second inlet opening in said housing for admitting hot water under pressure from said discharge line to the other one of said chambers, and a discharge opening in said housing for discharging the water from said other one of said chambers to said discharge head, said closure means being movable between a normally open position wherein hot water is allowed to flow from said discharge line through said second inlet opening into said second chamber and out of said second chamber through said discharge opening, and a closed position wherein said closure means prevents hot water from flowing into said second chamber and thence through said discharge head, whereby said valve means is operative in response to the operation of said electrically operated valve to control discharge of hot water from said water tank.

13. The beverage brewing machine set forth in claim 12, wherein said closure means includes a flexible diaphragm.

14. The beverage brewing machine set forth in claim 6, and further comprising an overflow line connected to said water tank and a mechanically operated valve disposed in said water inlet means downstream of said electrically controlled valve, said mechanical valve having a normally open position permitting water to flow therethrough and into said water tank so long as said electrically controlled valve is open and having a closed position wherein said mechanical valve prevents the flow of water to said water tank regardless of the condition of said electrically controlled valve, said mechanical valve being operable to the closed position thereof in response to the overflow of a predetermined quantity of water from said water tank through said overflow line.

15. The beverage brewing machine set forth in claim 6, wherein said water inlet means further comprises a first water line extending from said electrically controlled valve to said water tank for introducing water thereinto and a second water line extending from said first water line to said valve means, said valve means including closure means disposed in said discharge line and movable between a normally open position and a closed position relative to said discharge line, said second water line being disposed to discharge water against one side of said closure means so as to cause said closure means to move to said closed position thereof whereby the opening of said electrically controlled valve causes water to flow through said first water line to said water tank and concurrently to flow through said second water line to move said closure means to said closed position thereof and thereby prevent discharge of water through said discharge line so long as said electrically operated valve remains open.

16. The beverage brewing machine set forth in claim 15, wherein said valve means further includes spring means for normally biasing said closure means to said open position.

17. The beverage brewing machine set forth in claim 15, wherein said first water line further includes a flow restrictor therein for controlling the inlet water velocity to said water tank whereby said flow restrictor is operative to cause the water to flow through said first water line to said tank at a substantially constant rate regardless of the inlet water pressure to said electrically controlled valve.

18. The beverage brewing machine set forth in claim 17, wherein said flow restrictor constrains the flow of water to said water tank to a flow rate of substantially about one gallon per minute.

19. The beverage brewing machine set forth in claim 17, wherein said second water line is connected to said first water line upstream of said flow restrictor.

20. The beverage brewing machine set forth in claim 15, wherein said closure means includes a flexible diaphragm.

21. A beverage brewing machine comprising, in combination, a water tank having a side wall and a bottom wall, a cover having an opening therein and disposed on top of said water tank, thermostatically controlled heating means disposed within said water tank for heating and maintaining water within said water tank at a beverage brewing temperature, a discharge outlet in the sidewall of said water tank disposed substantially below the top of said water tank, a discharge head mounted in spaced relation to said water tank, a discharge water line connecting said discharge outlet in said water tank and said discharge head, means disposed below said discharge head for receiving a beverage producing material to be covered by hot water from said discharge head, an upstanding tube disposed in said water tank in communication with the opening in said cover, said tube terminating near the bottom wall of said water tank, water inlet means including an electrically controlled valve for introducing cold water into the top of said upstanding tube thereby to cause cold water to flow by gravity through said tube into the bottom portion of said water tank and to cause the hot water therein to be displaced to the upper portion of said water tank above said discharge outlet in an amount substantially equal to the amount of cold water introduced thereinto, manually operated switch means for initiating operation of said electrically controlled valve so as to cause cold water to flow into said water tank, switch means operative in response to upward displacement of water in said water tank to a predetermined level therein for terminating operation of said electrically controlled valve whereby said valve is operative to introduce only a predetermined quantity of cold water into said water tank, valve means having open and closed operative positions disposed in said discharge water line for controlling discharge of hot water therethrough, said valve means being operatively associated with said water inlet means and concurrently operative in response to operation of said electrically controlled valve, said valve means being operative to said closed position thereof so long as said electrically controlled valve is operating to allow cold water to enter said water tank whereby said valve means prevents discharge of hot water from said discharge outlet and said discharge line through said discharge head while said electrically controlled valve is open, said valve means being operable to said open position thereof upon termination of operation of said electrically controlled valve to allow the hot water in said water tank which was displaced above said discharge outlet to flow through said discharge outlet and said discharge line and said discharge head and over said beverage producing material and thereby cause a beverage extract to flow into an associated beverage receiving beaker in an amount corresponding to that predetermined quantity of cold water introduced into said water tank.

22. An automatic beverage brewing machine comprising, in combination, a water tank having a side wall and a bottom wall and a top water, thermostatically controlled heating means disposed within said water tank for heating and maintaining water therein at a beverage brewing temperature, a discharge outlet in said water tank disposed above the bottom wall thereof, a discharge head mounted in spaced relation to said water tank, a discharge water line connecting said discharge outlet in said water tank and said discharge head, means disposed below said discharge head for receiving a beverage producing material to be covered by hot water from said discharge head, an electrically controlled valve having an inlet adapted to be connected to a source of water and an outlet, a flow restrictor having an inlet connected to said valve outlet and having first and second outlets, a first water line connected at one end to said first outlet of said flow restrictor and having the opposite end thereof disposed for discharging water into said water tank whereby when said valve is opened cold water flows through said flow restrictor and through said first water line into said water tank to cause hot water in said tank to be upwardly displaced therein for discharge through said discharge outlet and said discharge line and said discharge head in an amount substantially equal to the amount of cold water introduced thereinto, manually operable switch means for initiating operation of said electrically controlled valve to cause cold water to flow therethrough, means operative in response to upward displacement of water in said water tank to a predetermined level therein for terminating operation of said electrically controlled valve whereby said electrically controlled valve is operative only to introduce a predetermined quantity of cold water into said water tank, valve means having open and closed operative positions disposed in said discharge water line for controlling discharge of hot water therethrough, said valve means including closure means disposed in said discharge line and movable between a normally open position and a closed position relative to said discharge line, a second water line connected at one end to said second outlet of said flow restrictor and connected at the opposite end to said valve means, said second water line being disposed to discharge water against one side of said closure means so as to cause said closure means to move to said closed position thereof, whereby opening of said electrically controlled valve causes water to flow through said flow restrictor and said first water line to said water tank and concurrently to flow through said second water line to move said closure means to said closed position thereof, thereby to prevent discharge of hot water through said discharge line so long as said electrically operated valve remains open, said closure means being operable to said open position thereof upon termination of operation of said electrically controlled valve to allow hot water to flow through said discharge head and over said beverage producing material and thereby cause a beverage extract to flow into an associated beverage receiving beaker in an amount corresponding to that predetermined quantity of cold water introduced into said water tank.

23. The beverage brewing machine set forth in claim 22, wherein said closure means includes a flexible diaphragm.

References Cited

UNITED STATES PATENTS

| | | | |
|---|---|---|---|
| 3,220,334 | 11/1965 | Martin | 99—282 |
| 3,332,337 | 7/1967 | Lowry | 99—282 |
| 3,366,034 | 1/1968 | Karlen | 99—282 |
| 3,369,477 | 2/1968 | Vittoe | 99—282 |

ROBERT W. JENKINS, *Primary Examiner.*

U.S. Cl. X.R.

99—285, 288, 295, 305